US008243151B2

(12) United States Patent
Tabuchi (10) Patent No.: US 8,243,151 B2
(45) Date of Patent: Aug. 14, 2012

(54) VIBRATION PREVENTION CONTROL CIRCUIT OF IMAGING DEVICE

(75) Inventor: Yoshihisa Tabuchi, Gifu (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 609 days.

(21) Appl. No.: 12/341,721

(22) Filed: Dec. 22, 2008

(65) Prior Publication Data
US 2009/0160955 A1 Jun. 25, 2009

(30) Foreign Application Priority Data

Dec. 25, 2007 (JP) ................................ 2007-332465

(51) Int. Cl.
H04N 5/228 (2006.01)
(52) U.S. Cl. ................................................... 348/208.7
(58) Field of Classification Search .............. 348/208.11
See application file for complete search history.

(56) References Cited

U.S. PATENT DOCUMENTS

| | | | | |
|---|---|---|---|---|
| 5,459,311 A * | 10/1995 | Brosnan | .................... | 250/214 C |
| 5,541,508 A | 7/1996 | Suzuki | | |
| 5,566,093 A * | 10/1996 | White | .......................... | 702/190 |
| 5,634,145 A | 5/1997 | Ohishi et al. | | |
| 5,822,623 A | 10/1998 | Urata et al. | | |
| 5,893,054 A * | 4/1999 | White | .......................... | 702/189 |
| 6,233,009 B1 * | 5/2001 | Morofuji et al. | ........... | 348/208.8 |
| 6,501,399 B1 * | 12/2002 | Byrd | ............................. | 341/111 |
| 7,460,154 B2 | 12/2008 | Kawahara | | |
| 7,640,741 B2 * | 1/2010 | Hara | ............................... | 60/527 |
| 7,881,402 B2 * | 2/2011 | Gao et al. | ....................... | 375/296 |

| | | | | |
|---|---|---|---|---|
| 2001/0038749 A1 | 11/2001 | Imada | | |
| 2002/0118844 A1 | 8/2002 | Welsh et al. | | |
| 2004/0052513 A1 * | 3/2004 | Ohkawara et al. | .............. | 396/55 |
| 2004/0056963 A1 * | 3/2004 | Ishikawa | .................... | 348/208.1 |
| 2005/0018051 A1 * | 1/2005 | Tomita et al. | .............. | 348/208.4 |
| 2005/0200712 A1 | 9/2005 | Uenaka | | |
| 2005/0201741 A1 | 9/2005 | Moriya | | |

(Continued)

FOREIGN PATENT DOCUMENTS

| | | |
|---|---|---|
| CN | 100559253 C | 11/2009 |
| EP | 1507408 A2 | 2/2005 |
| JP | 1-293739 A | 11/1989 |

(Continued)

OTHER PUBLICATIONS

Aronhime, P. 1999. All-Pass Filters. Wiley Encyclopedia of Electrical and Electronics Engineering.*

(Continued)

Primary Examiner — Tuan Ho
Assistant Examiner — Jason Flohre
(74) Attorney, Agent, or Firm — Cantor Colburn LLP (57) ABSTRACT

A vibration prevention control circuit is provided, comprising at least one analog-to-digital converter circuit that converts an output signal of a vibration detection element which detects vibration of an imaging device, and an output signal of a position detection element which detects a position of an optical component, into digital signals, and a logic circuit that generates a control signal which drives the optical component, based on the output signal of the vibration detection element which is digitized by the analog-to-digital converter circuit and the output signal of the position detection element which is digitized by the analog-to-digital converter circuit, wherein a phase delay circuit (all-pass filter) is provided that delays a phase of the output signal of the vibration detection element without changing an intensity in a predetermined frequency band and outputs the processed signal.

8 Claims, 5 Drawing Sheets

U.S. PATENT DOCUMENTS

| | | | |
|---|---|---|---|
| 2007/0103032 A1* | 5/2007 | Yamashita | 310/316.01 |
| 2007/0223755 A1* | 9/2007 | Salvetti et al. | 381/318 |
| 2009/0141134 A1 | 6/2009 | Kamiya et al. | |
| 2009/0160953 A1* | 6/2009 | Nagata et al. | 348/208.6 |
| 2010/0214426 A1* | 8/2010 | Kimura | 348/208.99 |

FOREIGN PATENT DOCUMENTS

| | | | |
|---|---|---|---|
| JP | 2-20925 A | 1/1990 | |
| JP | 2-262843 A | 10/1990 | |
| JP | 6-313718 A | 11/1994 | |
| JP | 7-325330 A | 12/1995 | |
| JP | 8-76061 A | 3/1996 | |
| JP | 8-79598 A | 3/1996 | |
| JP | 8-240831 A | 9/1996 | |
| JP | 10-123832 A | 8/1998 | |
| JP | 11-98420 A | 4/1999 | |
| JP | 2000-13671 A | 1/2000 | |
| JP | 2000-250086 A | 9/2000 | |
| JP | 2000-356733 A | 12/2000 | |
| JP | 2004-328606 A | 11/2004 | |
| JP | 2005-115253 A | 4/2005 | |
| JP | 2007-101672 A | 4/2007 | |
| JP | 2007-127754 A | 5/2007 | |
| JP | 2007-206382 A | 8/2007 | |

OTHER PUBLICATIONS

Office Action for Korean Application No. 10-2008-119547 issued Apr. 1, 2010 with English translation.

Office Action for Korean Application No. 10-2008-119384 issued Apr. 1, 2010 with English translation.

Office Action for Chinese Application No. 200810182174.9 issued Apr. 22, 2010 with English translation.

Office Action for Korean Application No. 10-2008-119661 issued Mar. 19, 2010 with English translation.

Office Action for Chinese Application No. 200810177436.2 issued Apr. 29, 2010 with English translation.

Office Action for Korean Patent Application No. 10-2008-119661 mailed Sep. 17, 2010 with English translation.

Office Action for Korean Patent Application No. 10-2010-58542 mailed Sep. 17, 2010 with English translation.

US Office Action dated Mar. 17, 2011 for U.S. Appl. No. 12/327,293.

US Office Action dated Mar. 10, 2011 for U.S. Appl. No. 12/327,235.

US Office Action dated Apr. 22, 2011 for U.S. Appl. No. 12/343,646.

Notice of Grounds for Rejection for Japanese Patent Application Serial No. 2007-330624, mailed Feb. 14, 2012, with English translation.

Notice of Grounds for Rejection for Japanese Patent Application Serial No. 2007-330623, mailed Feb. 14, 2012, with English translation.

Notice of Grounds for Rejection for Japanese Patent Application No. 2007-332465, mailed Jun. 5, 2012, with English translation.

Notice of Grounds for Rejection for Patent Application No. 2007-332466, mailed Jun. 5, 2012, with English translation.

\* cited by examiner

VIBRATION PREVENTION CONTROL CIRCUIT OF IMAGING DEVICE

CROSS-REFERENCE TO RELATED APPLICATION

The disclosure of Japanese Patent Application No. 2007-332465 including specification, claims, drawings, and abstract is incorporated herein by reference.

BACKGROUND OF THE INVENTION

1. Field of the Invention

The present invention relates to a vibration prevention control circuit which is equipped in an imaging device.

2. Description of the Related Art

Recently, imaging devices such as a digital still camera and a digital video camera realize improved image quality by increasing a number of pixels of an imaging element provided in the imaging device. On the other hand, as another method of realizing improved image quality for the imaging device, it is desired for the imaging device to have a vibration correction function in order to prevent vibration of an image of an object caused by vibration of the hand holding the imaging device.

More specifically, a detection element such as a gyro sensor is provided in an imaging device, and optical components such as the lens and the imaging element are driven according to an angular velocity component caused by vibration of the imaging device, to prevent vibration of the object image. With this structure, even if the imaging device is vibrated, the component of the vibration is not reflected in the obtained image signal, and an image signal having no image vibration and a high image quality can be acquired.

Figure 5:
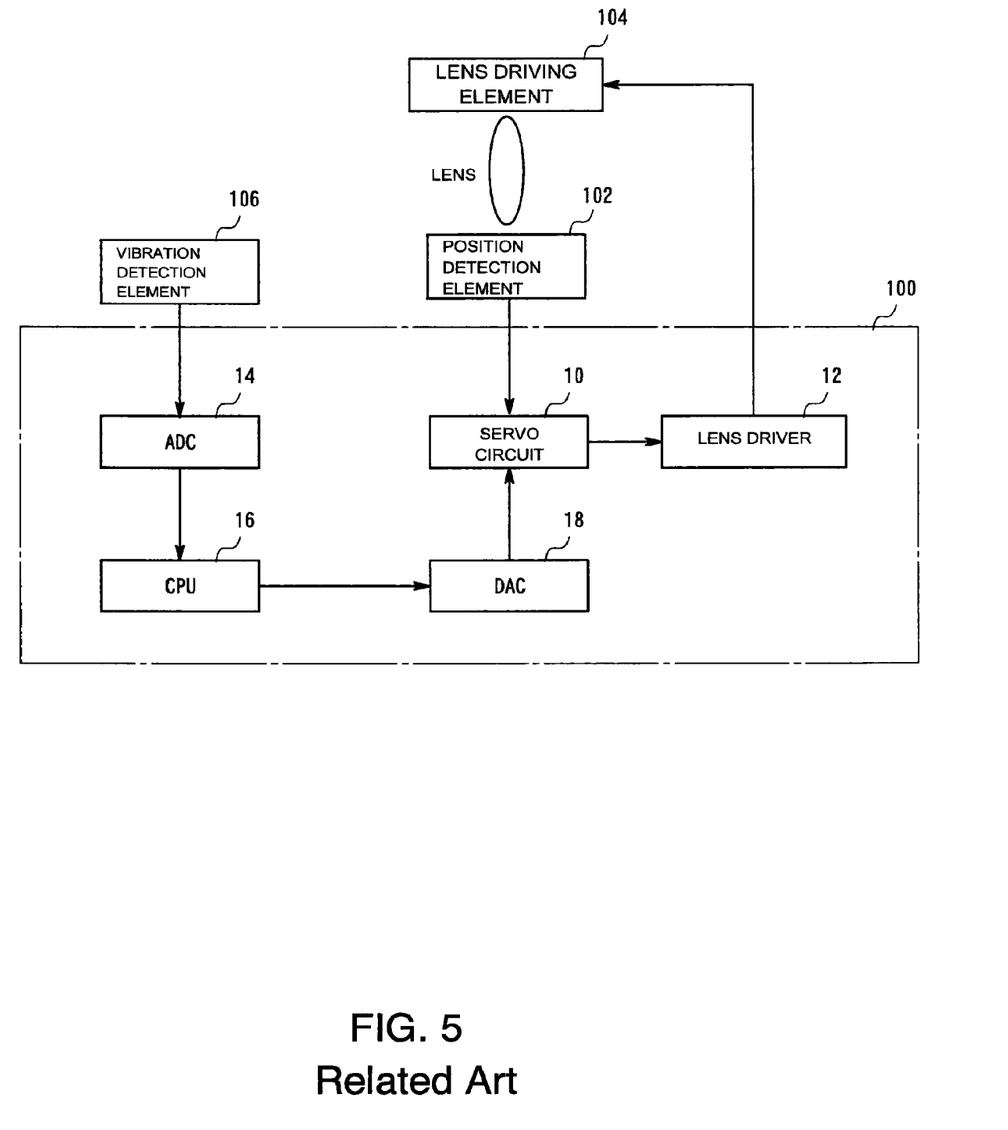
FIG. 5 is a diagram showing a structure of a vibration prevention control circuit in the related art.

FIG. 5 is a block diagram of a vibration prevention control circuit 100 of the related art which is used for realizing the vibration prevention function. The vibration prevention control circuit 100 is provided in an imaging device, and operates according to control of a main control circuit (not shown) provided in the imaging device. The vibration prevention control circuit 100 is connected to a position detection element 102, a lens driving element 104, and a vibration detection element 106.

The position detection element 102 detects a position of a lens which is used in the imaging device. A hall element may be used as the position detection element 102. The hall element produces an inductive current corresponding to an absolute position of the lens and outputs a voltage signal to the vibration prevention control circuit 100. A voice coil motor may be used as the lens driving element 104. The vibration prevention control circuit 100 controls a position of a movable coil of the voice coil motor, that is, a position of the lens with respect to an optical axis which forms a reference, by adjusting the value of the voltage to be applied to the lens driving element 104. The lens driving element 104 drives the lens within a plane which is perpendicular to the reference optical axis of the imaging device. The vibration detection element 106 detects vibration of the imaging device and outputs the result of the detection to the vibration prevention control circuit 100. A gyro sensor may be employed as the vibration detection element 106. The vibration detection element 106 generates an angular velocity signal corresponding to the vibration applied to the imaging device and outputs the angular velocity signal to the vibration prevention control circuit 100.

For each of the position detection element 102, the lens driving element 104, and the vibration detection element 106, it is desired for at least two elements to be provided. For example, a plurality of elements are provided corresponding to a horizontal component and a vertical component in a plane perpendicular to the optical axis of the imaging device, and the lens position detection, lens movement, and vibration detection of the imaging device are executed.

Next, the vibration prevention control circuit 100 will be described in detail. The vibration prevention control circuit 100 comprises a servo circuit 10, a lens driver 12, an analog-to-digital converter circuit (ADC) 14, a CPU 16, and a digital-to-analog converter circuit (DAC) 18.

The servo circuit 10 generates a signal for controlling the lens driving element 104 according to the voltage signal which is output from the position detection element 102. The servo circuit 10 comprises an analog filter circuit including an external resistor element, a capacitor, etc., and generates a signal which controls the lens driving element 104 such that the optical axis of the lens matches the center of the imaging element provided in the imaging device. The lens driver 12 generates a lens driving signal which drives the lens driving element 104 based on the signal which is output from the servo circuit 10.

The ADC 14 converts the analog angular velocity signal which is output from the vibration detection element 106 into a digital signal. The CPU 16 generates an angle signal which indicates an amount of movement of the imaging device based on the digital angular velocity signal. The CPU 16 is connected to a memory (not shown) and executes the generation process of the angle signal based on software stored in the memory. The DAC 18 converts the digital angle signal generated by the CPU 16 into an analog signal.

The servo circuit 10 generates a signal which controls the lens driving element 104 according to a signal in which the analog angle signal which is output from the DAC 18 and the voltage signal which is output from the position detection element 102 are added. In other words, in order to prevent vibration of an object image due to hand vibration, the position of the lens is changed based on the angle signal indicating the amount of movement of the imaging device, to inhibit vibration of the image of the object on the imaging element. With this structure, the vibration of the object image due to the vibration of the hand can be inhibited and an image signal of high image quality can be obtained.

In order to facilitate changing of an adjustment value of the filter provided in the vibration prevention control circuit, it is desired to replace the servo circuit, the lens driver, and the processor circuit of the vibration detection signal with logic circuits which can digitally process. In addition, because the vibration prevention control circuit is equipped in an imaging element such as a digital camera or the like or a lens module of the imaging element, the size must be minimized even when logic circuits are employed.

The angular velocity signal which is output from the vibration detection element 106 is integrated so that the angular velocity signal is converted into a signal indicating the angle (position) of the vibration, and the signal is used as a reference for comparison to a signal indicating the position of the optical element which is output from the position detection element 102, so that a driving signal which controls the position of the optical element is generated.

In this case, because the angular velocity signal can be considered as a superposition of sine waves (or cosine waves), when the angular velocity signal is integrated with respect to time, the phase is shifted by 90°. However, the vibration prevention control circuit includes a circuit which processes the angular velocity signal, and the phase of the angle signal obtained by the integration circuit would be deviated by these circuits. Because of this, a signal in which the phase is shifted by 90° cannot be obtained. There is a problem in that, because of this deviation, the angle (position) signal obtained based on the output signal from the vibration detection element 106 cannot be accurately compared to the position signal which is output from the position detection element 102.

SUMMARY OF THE INVENTION

According to one aspect of the present invention, there is provided a vibration prevention control circuit which drives an optical component of an imaging device according to vibration, and which reduces influence of the vibration on imaging, the vibration prevention control circuit comprising at least one analog-to-digital converter circuit which converts an output signal of a vibration detection element which detects vibration of the imaging device and an output signal of a position detection element which detects a position of the optical component, into digital signals, and a logic circuit which generates a control signal which drives the optical component, based on the output signal of the vibration detection element which is digitized by the analog-to-digital converter circuit and the output signal of the position detection element which is digitized by the analog-to-digital converter circuit. The logic circuit comprises a phase delay circuit which delays a phase of the output signal of the vibration detection element without changing an intensity in a predetermined frequency band, and outputs the processed signal.

BRIEF DESCRIPTION OF THE DRAWINGS

Preferred embodiments of the present invention will be described in detail based on the following figures, wherein.

DESCRIPTION OF THE PREFERRED EMBODIMENT

Figure 1:
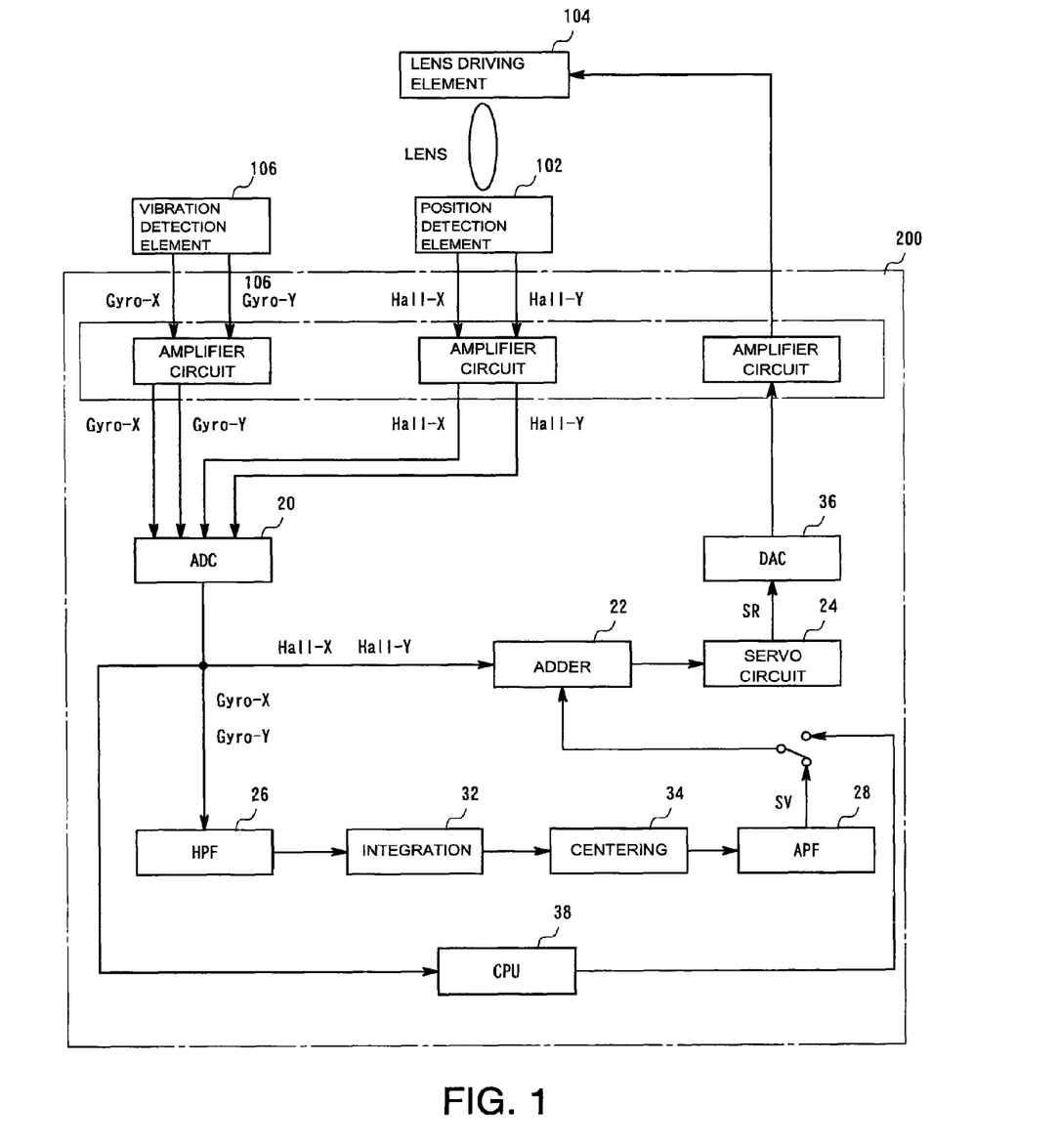
FIG. 1 is a diagram showing a structure of a vibration prevention control circuit in a preferred embodiment of the present invention.

As shown in a functional block diagram of FIG. 1, a vibration prevention control circuit 200 in a preferred embodiment of the present invention comprises an analog-to-digital converter circuit (ADC) 20, an adder circuit 22, a servo circuit 24, a high-pass filter (HPF) 26, an integration circuit 32, a centering processor circuit 34, an all-pass filter (APF) 28, a digital-to-analog converter circuit (DAC) 36, and a CPU 38.

The vibration prevention control circuit 200 is connected to a position detection element 102, a lens driving element 104, and a vibration detection element 106. These elements are similar to those described above with reference to the related art. In other words, the position detection element 102 is provided for at least two axes so that the position of the lens driven by the lens driving element 104 can be measured in a manner to allow at least an orthogonal conversion, and the vibration detection element 106 is also provided for at least two axes so that the components of the vibration can be orthogonally converted along two axes in a yaw direction and a pitch direction.

The present embodiment is described with reference to an example case in which the position detection element 102 and the vibration detection element 106 are provided so that the lens position and vibration can be detected for the yaw direction (X-axis direction) and the pitch direction (Y-axis direction) of the imaging device. In the following description, the output signals of the position detection element 102 and the vibration detection element 106 are processed, such as an addition between the X-axis components of the output signals and between the Y-axis components of the output signals, and the lens position is controlled in the yaw direction (X-axis direction) and the pitch direction (Y-axis direction) based on the processed signals.

The ADC 20 converts an analog voltage signal which is output from the position detection element 102, for example, the hall element, in to a digital signal. The hall element generates an inductive current corresponding to a magnetic force using a magnet which is fixed on the lens. In other words, the hall element outputs a voltage signal which indicates the position of the lens according to a distance to the lens, and the ADC 20 converts the voltage signal into a digital signal and outputs the converted signal as a position signal. The ADC 20 has a structure in which a signal which indicates a reference, for example, a digital value of "0", is output when the optical axis of the lens and the center of the imaging element provided in the imaging device match.

The ADC 20 also converts an analog angular velocity signal which is output from the vibration detection element 106, for example, a gyro sensor, into a digital signal. In other words, the ADC 20 digitizes the output signals from the position detection element 102 and the vibration detection element 106 in a time divisional manner and outputs the converted signals.

More specifically, the ADC 20 digitizes and outputs a signal of an X-axis component of vibration detected by the vibration detection element 106 (Gyro-X), a signal of a Y-axis component of vibration (Gyro-Y), a signal of an X-axis component of a position of the lens detected by the position detection element 102 (Hall-X), and a signal of a Y-axis component of the position (Hall-Y). The ADC 20 outputs the signals Gyro-X and Gyro-Y to the HPF 26 and the signals Hall-X and Hall-Y to the adder circuit 22.

The HPF 26 removes a direct current component included in the angular velocity signal which is the output signal of the vibration detection element 106 and extracts a high-frequency component of the angular velocity signal in which the vibration of the imaging device is reflected.

The integration circuit 32 integrates the angular velocity signals (Gyro-X and Gyro-Y) which are output from the HPF 26 and generates angle signals which indicate an amount of movement of the imaging device. Preferably, the integration circuit 32 comprises a digital filter (not shown), and determines the angle signal, that is, the amount of movement of the imaging device, by applying a filter process according to a filter coefficient which is set in a register (not shown).

The angular velocity signals (Gyro-X and Gyro-Y) are represented as a superposition of sine waves (sin waves), and the integration of the angular velocity signal may be considered equivalent to conversion to cosine waves (cos waves) in which the frequency components of the angular velocity signal are delayed by 90°.

The centering processor circuit 34 subtracts a predetermined value from the angle signal which is output from the integration circuit 32, and generates vibration component signals (SV-X and SV-Y) which indicate an amount of movement of the imaging device. When the vibration correction process is applied in the imaging device, there may be cases where the position of the lens is gradually moved apart from the reference position as the vibration correction process is continuously executed, and the position of the lens may reach a point near a limit point of the movable range of the lens. In this case, the continuation of the vibration correction process may result in a situation where the lens may be moved in a certain direction, but not in the other direction. The centering processor circuit 34 is provided in order to prevent this phenomenon, and applies control by subtracting a predetermined value from the angle signal so that the position of the lens does not easily reach the limit point of the movable range of the lens.

Preferably, the centering processor circuit 34 comprises a digital filter (not shown), and applies the process to subtract the predetermined value from the angle signal by applying a filter process according to a filter coefficient which is set in a register (not shown).

The APF 28 receives an output signal of the centering processor circuit 34, delays only the phase without changing the intensity of the signal of a predetermined frequency band, and outputs the processed signal. In other words, because the signal indicating the vibration of the imaging-device is in the frequency band of approximately 1 Hz to 20 Hz, more specifically, the frequency band of greater than or equal to 2 Hz and less than or equal to 5 Hz, the APF 28 only delays the phase without changing the intensity (gain) of this frequency band, and outputs the resulting signal.

Figure 2:
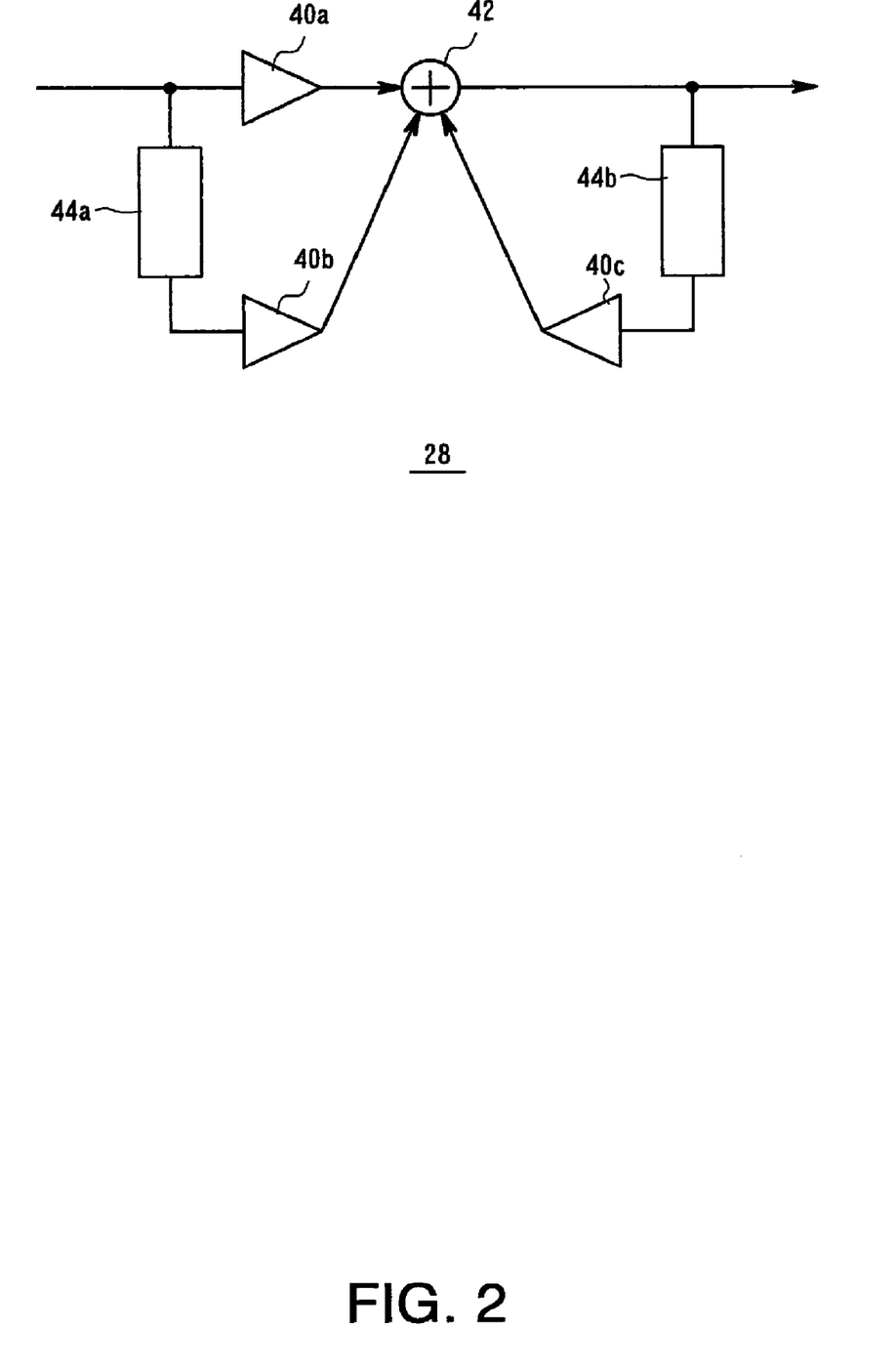
FIG. 2 is a diagram showing an example structure of an all-pass filter in a preferred embodiment of the present invention.

The APF 28 may comprise a digital filter. More specifically, as shown in FIG. 2, the APF 28 may comprise a first order filter having multipliers 40*a*, 40*b*, and 40*c*, an adder 42, and delay elements 44*a* and 44*b*.

Figure 3:
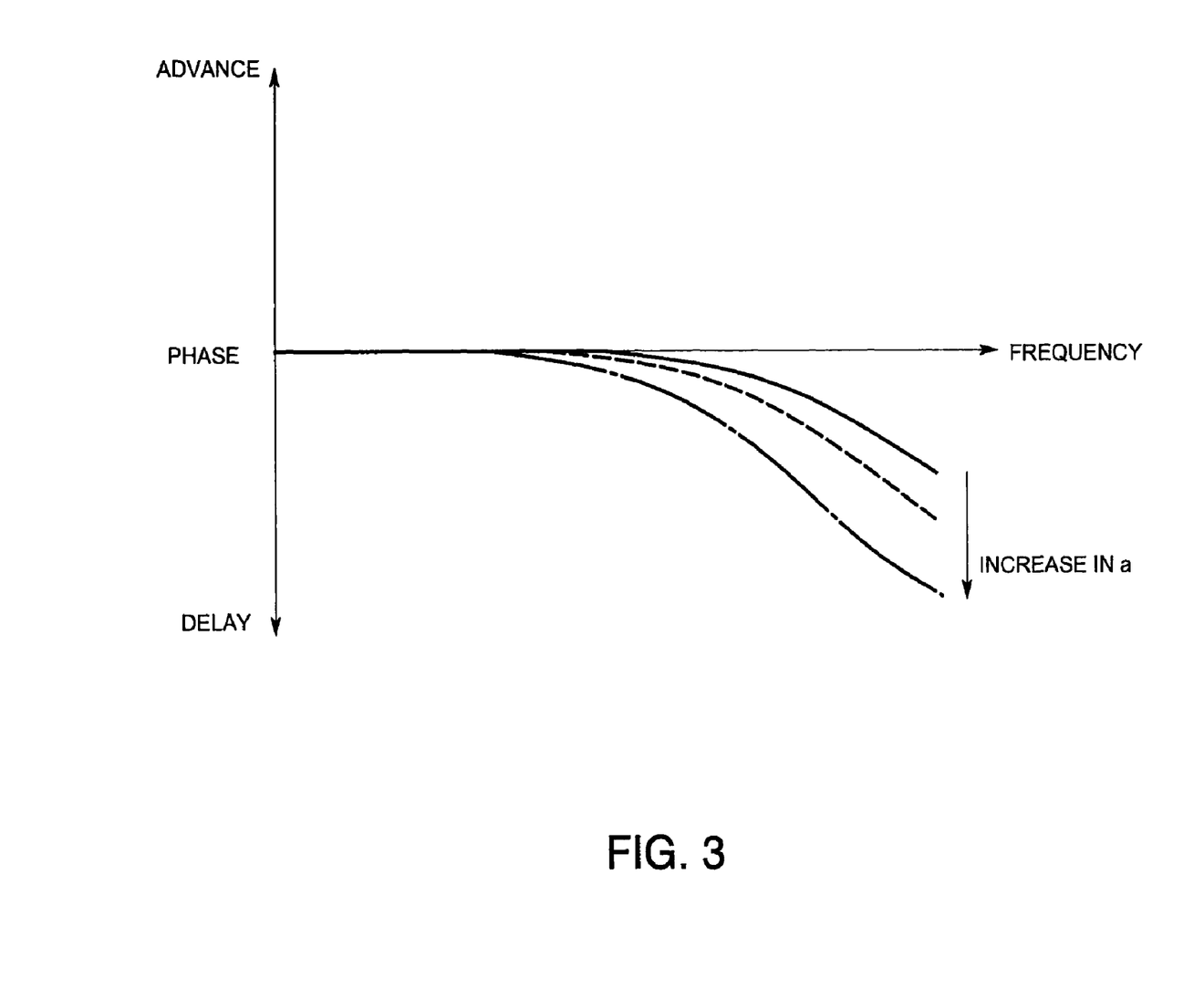
FIG. 3 is a diagram showing an example filter characteristic of an all-pass filter.

In such a first order filter, a tap coefficient of the multiplier 40*a* is set to—a (negative value), a tap coefficient of the multiplier 40*b* is set to 1, and a tap coefficient of the multiplier 40*c* is set to a (positive value), so that a filter characteristic of an all-pass filter can be realized which only delays the phase without changing the intensity of the signal, and outputs the resulting signal, as shown in FIG. 3. By changing the absolute value of the coefficient a, it is possible to realize a filter characteristic in which the phase delay is increased as the frequency of the transmitting signal is increased.

Figure 4:
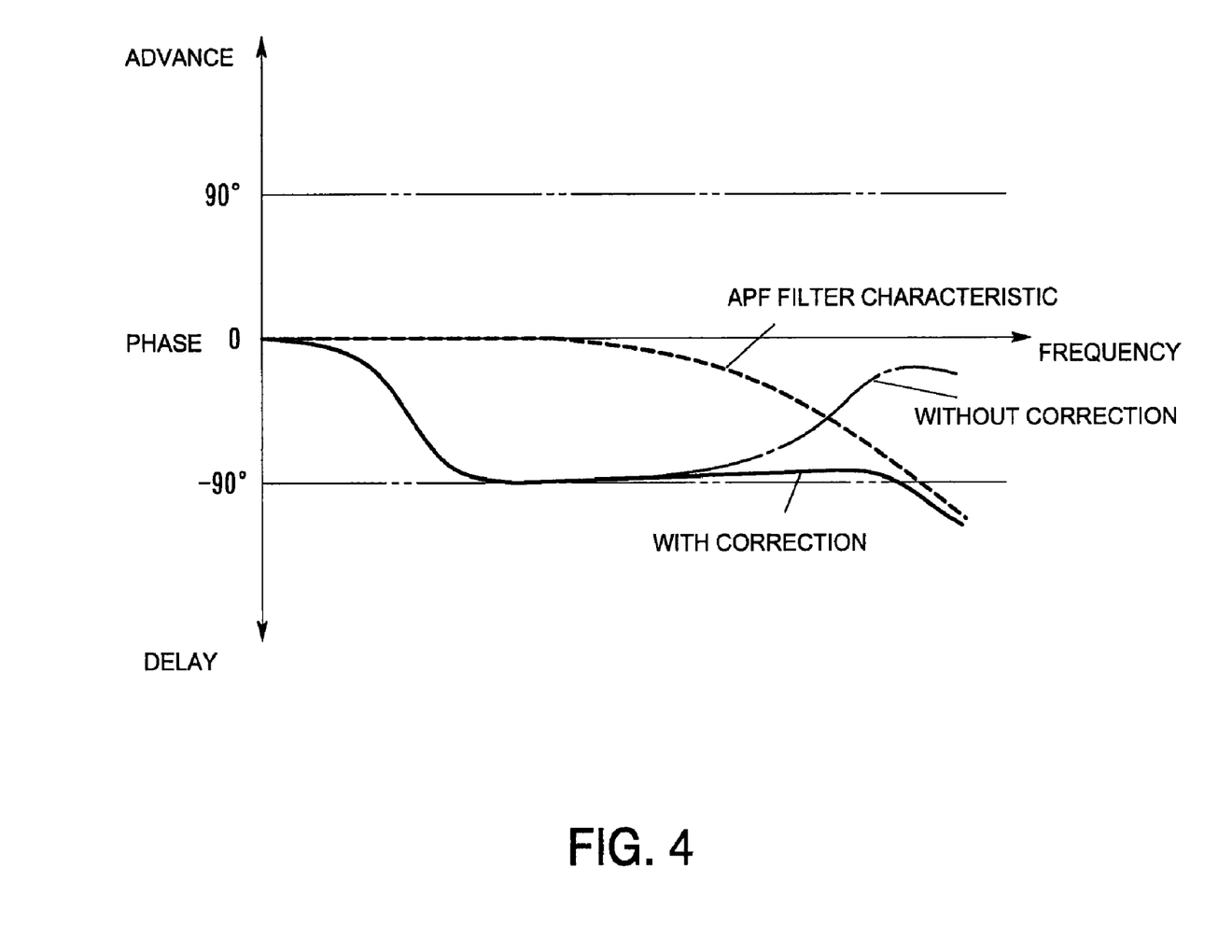
FIG. 4 is a diagram for explaining a phase delay process in a preferred embodiment of the present invention.

In general, a signal processed by the HPF 26, the integration circuit 32, and the centering processor circuit 34 has a state in which the phase is advanced from the ideal phase delay (−90°) as the frequency of the signal is increased, as shown by a one-dot-and-chain line of FIG. 4. Thus, by setting the coefficient a as shown by a dotted line in FIG. 4 so that the phase delay is such as to approximately cancel the advance of the phase, it is possible to correct the signal to a signal having an approximately ideal phase delay (−90°) in the frequency band of greater than or equal to 1 Hz and less than or equal to 20 Hz, in particular, the frequency band of greater than or equal to 2 Hz and less than or equal to 5 Hz, which is necessary for the vibration correction process, as shown by a solid line of FIG. 4.

The adder circuit 22 adds the position signal (Hall-X) which is output from the ADC 20 and the vibration component signal of the X-axis component (SV-X) having the phase adjusted by the APF 28, and also adds the position signal (Hall-Y) which is output from the ADC 20 and the vibration component signal of Y-axis component (SV-Y) having the phase adjusted by the APF 28, and outputs the resulting signals to the servo circuit 24.

The servo circuit 24 generates a correction signal SR for controlling the driving of the lens driving element 104, according to the output signals from the adder circuit 22. The servo circuit 24 comprises a register and a digital filter, and applies a filter process using a filter coefficient which is stored in the register.

The DAC 36 converts the digital correction signal SR into an analog signal. Based on the correction signal SR which is converted into an analog signal by the DAC 36, the lens driving element 104 drives the lens of the imaging device in the X-axis direction and in the Y-axis direction.

Movement control of the lens for correcting the vibration of the object image due to hand vibration using the vibration prevention control circuit 200 of FIG. 1 will now be described.

First, a case will be described in which there is no vibration of the object image due to hand vibration. Because the position of the lens driven by the lens driving element 104 is such that the optical axis of the lens and the center of the imaging element provided in the imaging device match, the ADC 20 outputs digital position signals (Hall-X and Hall-Y) which indicate "0". The servo circuit 24 outputs a correction signal SR which controls the lens driving element 104 to maintain the current lens position when the values of the position signals (Hall-X and Hall-Y) are "0".

When, on the other hand, the position of the lens and the center of the imaging element do not match, the ADC 20 outputs digital position signals (Hall-X and Hall-Y) showing values different from "0". The servo circuit 24 outputs a correction signal SR which controls the lens driving element 104 so that the values of the position signals (Hall-X and Hall-Y) become "0", according to the values which are output from the ADC 20. With repetition of the above-described operation, the vibration prevention control circuit 200 controls the position of the lens so that the position of the lens and the center of the imaging element match.

Next, a case will be described in which vibration of the object image is caused due to the hand vibration. Because the position of the lens driven by the lens driving element 104 is such that the optical axis of the lens and the center of the imaging element provided in the imaging device match, the ADC 20 outputs digital position signals (Hall-X and Hall-Y) indicating "0". On the other hand, because the imaging device is moved due to the vibration of the hand, the integration circuit 32, the centering processor circuit 34, and the APF 28 output vibration component signals (SV-X and SV-Y) indicating an amount of movement of the imaging device.

In this case, in the vibration prevention control circuit 200 of the present embodiment, because the APF 28 is provided, the vibration component signals (SV-X and SV-Y), which are angle signals (position signals) in which the angular velocity signals (Gyro-X and Gyro-Y) are accurately delayed by 90°, are input to the adder 22.

The servo circuit 24 generates a correction signal SR according to a signal in which the position signal (Hall-X) indicating "0" which is output from the ADC 20 and the vibration component signal of X-axis component (SV-X) which is output from the APF 28 are added. In this case, although the position signal (Hall-X) is "0", because the vibration component signal (SV-X) which is not "0" is added, the servo circuit 24 generates a correction signal SR which moves the lens. The lens driving element 104 of X-axis is controlled according to the correction signal SR. Similarly, the servo circuit 24 generates a correction signal SR according to a signal in which the position signal (Hall-Y) indicating "0", which is output from the ADC 20, and the vibration component signal of Y-axis component (SV-Y), which is output from the APF 28, are added. In this case, although the position signal (Hall-Y) is "0", because the vibration component signal (SV-Y) which is not "0" is added, the servo circuit 24 generates the correction signal SR which moves the lens. The lens driving element 104 for the Y-axis is controlled according to the correction signal SR. Because the lens driving element 104 moves the lens based on the correction signal SR which is output from the servo circuit 24, the imaging element provided in the imaging device can obtain a signal in which the vibration of the object image due to the hand vibration is inhibited. By repeating such control, the vibration prevention control circuit 200 realizes the vibration correction control.

In the present embodiment, a structure is employed in which, when the angle signal indicating the amount of movement of the imaging device is generated based on the angular velocity signal obtained from the vibration detection element 106, the angle signal is generated using the HPF 26, the integration circuit 32, the centering processor circuit 34, and the APF 28. Because these circuits comprise digital filters, the filter coefficients can be easily changed. With such a configuration, the filter coefficient can be easily adjusted according to the system of the imaging device.

In addition, in the present embodiment, a structure is employed in which the vibration prevention control circuit 200 comprises the HPF 26, the integration circuit 32, the centering processor circuit 34, and the APF 28. With this structure, it is possible to reduce the circuit area compared to a structure in which the above-described processes are executed by the CPU 38. In this manner, it is possible to reduce the cost of the semiconductor chip on which the vibration prevention control circuit 200 is equipped.

Although the CPU 38 is also equipped in the vibration prevention control circuit 200, the CPU 38 is used for, for example, setting the coefficients of various filters and control parameters of the servo circuit 24 included in the vibration prevention control circuit 200. Therefore, it is not necessary to use a high-performance processor for the CPU 38, that is, it is not necessary to use a processor with a large circuit area.

Alternatively, it is also preferable to employ a configuration in which the tap coefficient a of the APF 28 can be changed by the CPU 38. More specifically, a structure may be employed in which the gain values of the multipliers 40a-40b can be set in a register or the like and the register values can be changed by the CPU 38.

In addition, although in the present invention, a structure is employed in which the process by the APF 28 is applied after the processes of the HPF 26, the integration circuit 32, and the centering processor circuit 34 are applied, the present invention is not limited to such a configuration. For example, the process by the APF 28 may be applied so that the vibration component signals (SV-X and SV-Y) which are input to the adder 22 become delayed in phase by 90° at a time before the process by the HPF 26, a time after the process by the HPF 26 and before the process by the integration circuit 32, or a time after the process by the integration circuit 32 and before the process by the centering processor circuit 34.

Moreover, although in the present embodiment, a configuration is employed in which the hall element, the voice coil motor, and the gyro sensor are employed as the position detection element 102, the lens driving element 104, and the vibration detection element 106, the present invention is not limited to such a configuration. For example, a piezo element may be used for the lens driving element 104. In addition, for the vibration detection element 106, a sensor which detects acceleration in a linear direction may be used and the vibration of the imaging device may be detected based on the acceleration signal.

In addition, a stepping motor may be used for the lens driving element 104. In this case, the high-pass filter 26, the integration circuit 32, and the centering processor circuit 34 generate an angle signal indicating the amount of movement of the imaging device based on the angular velocity signal detected by the position detection element 102. The vibration prevention control circuit 200 generates a pulse which drives the stepping motor based on the angle signal and outputs the generated pulse to the stepping motor. In this manner, a vibration correction system can be realized using the vibration prevention control circuit 200 and the stepping motor.

Although in the present embodiment, a lens shift method is employed in which the vibration correction process is executed by driving the lens, the present invention is not limited to such a configuration. For example, the present invention can be applied to a CCD shift method in which the imaging element such as the CCD element is shifted according to the vibration of the imaging device. In this case, the position detection element 102 may be set as an element which detects the position of the imaging element and the lens driving element 104 may be set as an element which drives the imaging element.

What is claimed is:

1. A vibration prevention control circuit that drives an optical component of an imaging device according to vibration and that reduces influence of the vibration on imaging, the vibration prevention control circuit comprising:
   at least one analog-to-digital converter circuit that converts an output signal of a vibration detection element, which detects vibration of the imaging device, and an output signal of a position detection element which detects a position of the optical component, into digital signals; and
   a logic circuit that generates a control signal which drives the optical component, based on the output signal of the vibration detection element, which is digitized by the analog-to-digital converter circuit, and the output signal of the position detection element which is digitized by the analog-to-digital converter circuit, wherein
   the logic circuit comprises a phase delay circuit that increases phase delays of the output signal of the vibration detection element as the frequency becomes higher, without changing an intensity in a predetermined frequency band, and outputs the processed signal.

2. The vibration prevention control circuit according to claim 1, wherein the phase delay circuit is an all-pass filter.

3. The vibration prevention control circuit according to claim 2, wherein the all-pass filter comprises a first-order all-pass filter.

4. The vibration prevention control circuit according to claim 1, wherein
   the logic circuit applies the process by the phase delay circuit after an integration process is applied on the output signal of the vibration detection element which is digitized by the analog-to-digital converter circuit.

5. The vibration prevention control circuit according to claim 1, wherein
   the logic circuit applies an integration process on the output signal of the vibration detection element which is digitized by the analog-to-digital converter circuit, and
   the process by the phase delay circuit is applied before the integration process.

6. An imaging device comprising the vibration prevention control circuit according to claim 1, comprising the optical component;
the vibration detection element;
the position detection element; and
an optical component driving element that is connected to the vibration prevention control circuit and drives the optical component according to the control signal.

7. A vibration prevention control circuit that drives an optical component of an imaging device according to vibration and reduces influence of the vibration on imaging, the vibration prevention control circuit comprising:
at least one analog-to-digital converter circuit that converts an output signal of a vibration detection element, which detects vibration of the imaging device, into a digital signal; and
a logic circuit that generates a control signal which drives the optical component, based on the output signal of the vibration detection element which is digitized by the analog-to-digital converter circuit, wherein
the logic circuit comprises a phase delay circuit that increases phase delays of the output signal of the vibration detection element as the frequency becomes higher, without changing an intensity in a predetermined frequency band and outputs the processed signal.

8. An imaging device comprising the vibration prevention control circuit according to claim 7, comprising:
the optical component;
the vibration detection element; and
an optical component driving element that is connected to the vibration prevention control circuit and that drives the optical component according to the control signal.

* * * * *